United States Patent
Park et al.

[11] Patent Number: 5,935,299
[45] Date of Patent: Aug. 10, 1999

[54] APPARATUS AND METHOD OF SPRAY DRYER/BAG FILTER USING CIRCULATING SHIELD AIR

[75] Inventors: Chil-Lim Park; Eui Sin Lee; Byung-Hwan Kim; Gi-Ho Park; Hee Jin In, all of Kyungki-do, Rep. of Korea

[73] Assignee: Daewoo Corporation, Seoul, Rep. of Korea

[21] Appl. No.: 08/923,888

[22] Filed: Sep. 4, 1997

[30] Foreign Application Priority Data

Mar. 13, 1997 [KR] Rep. of Korea ............ 97-8388

[51] Int. Cl.⁶ ............... B01D 47/06; B01F 3/04
[52] U.S. Cl. ............... 95/204; 95/214; 261/116; 261/DIG. 27
[58] Field of Search ............... 95/204, 214; 261/116, 261/DIG. 27

[56] References Cited

U.S. PATENT DOCUMENTS

| | | | |
|---|---|---|---|
| 4,083,932 | 4/1978 | Muraco et al. | 261/116 |
| 4,469,493 | 9/1984 | Tuovinen et al. | 261/116 |
| 4,880,447 | 11/1989 | Bloch | 261/116 |
| 4,980,099 | 12/1990 | Myers et al. | 261/116 |
| 5,194,076 | 3/1993 | Myers et al. | 261/116 |
| 5,354,364 | 10/1994 | Johnson et al. | 95/204 |
| 5,397,480 | 3/1995 | Dickerson | 261/116 |
| 5,449,390 | 9/1995 | Duncan et al. | 261/116 |

Primary Examiner—Jay H. Woo
Assistant Examiner—Minh-Chau T. Pham
Attorney, Agent, or Firm—Darby & Darby

[57] ABSTRACT

A spray dryer/bag filter apparatus for removing flue gas from an incinerator, which is structurized to re-circulate the purified gas as the shield air for protecting the slurry spraying nozzle thermally from hot gas without using any additional blower to introduce external air, that the flue gas is not diluted.

5 Claims, 3 Drawing Sheets

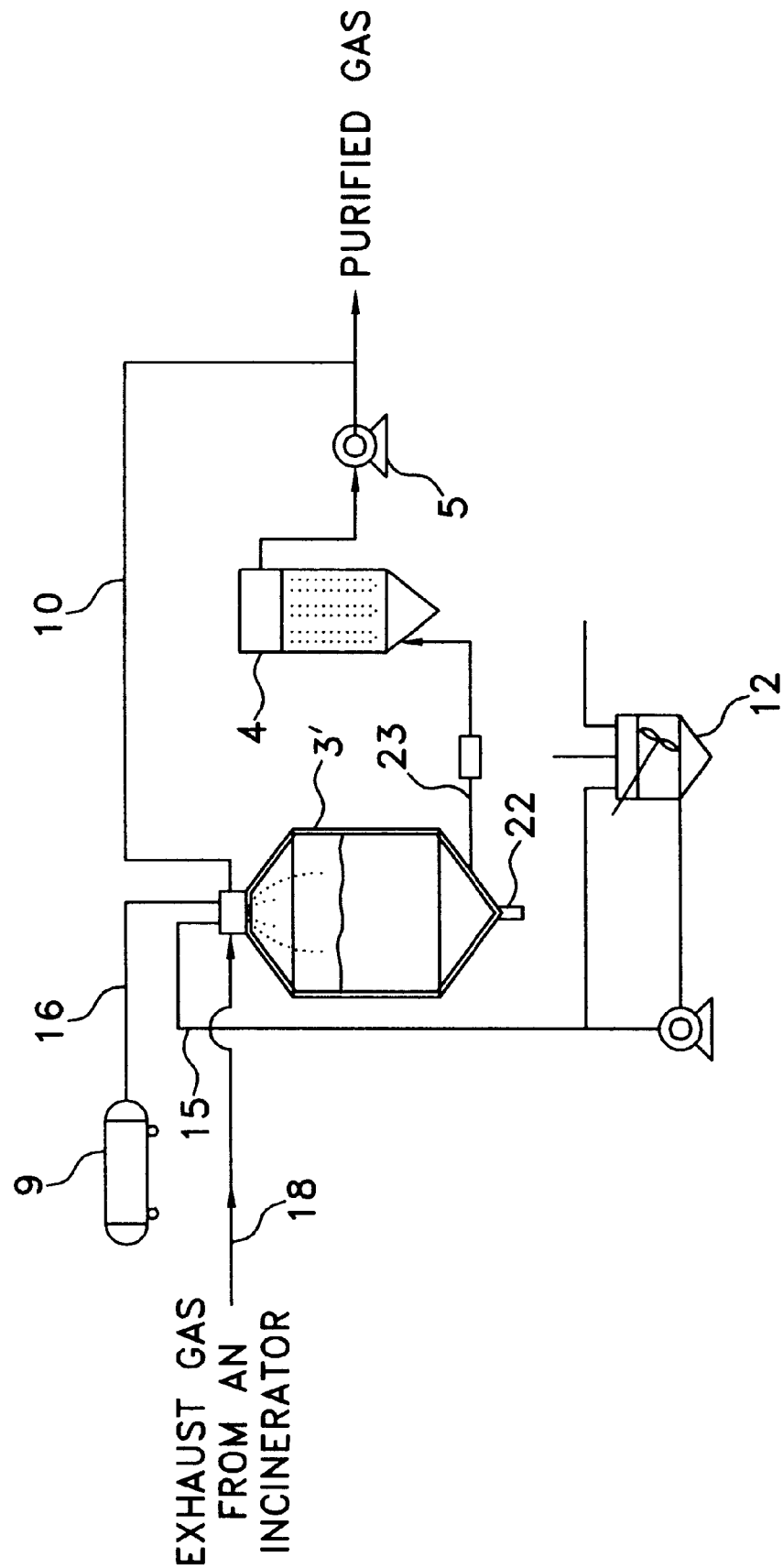

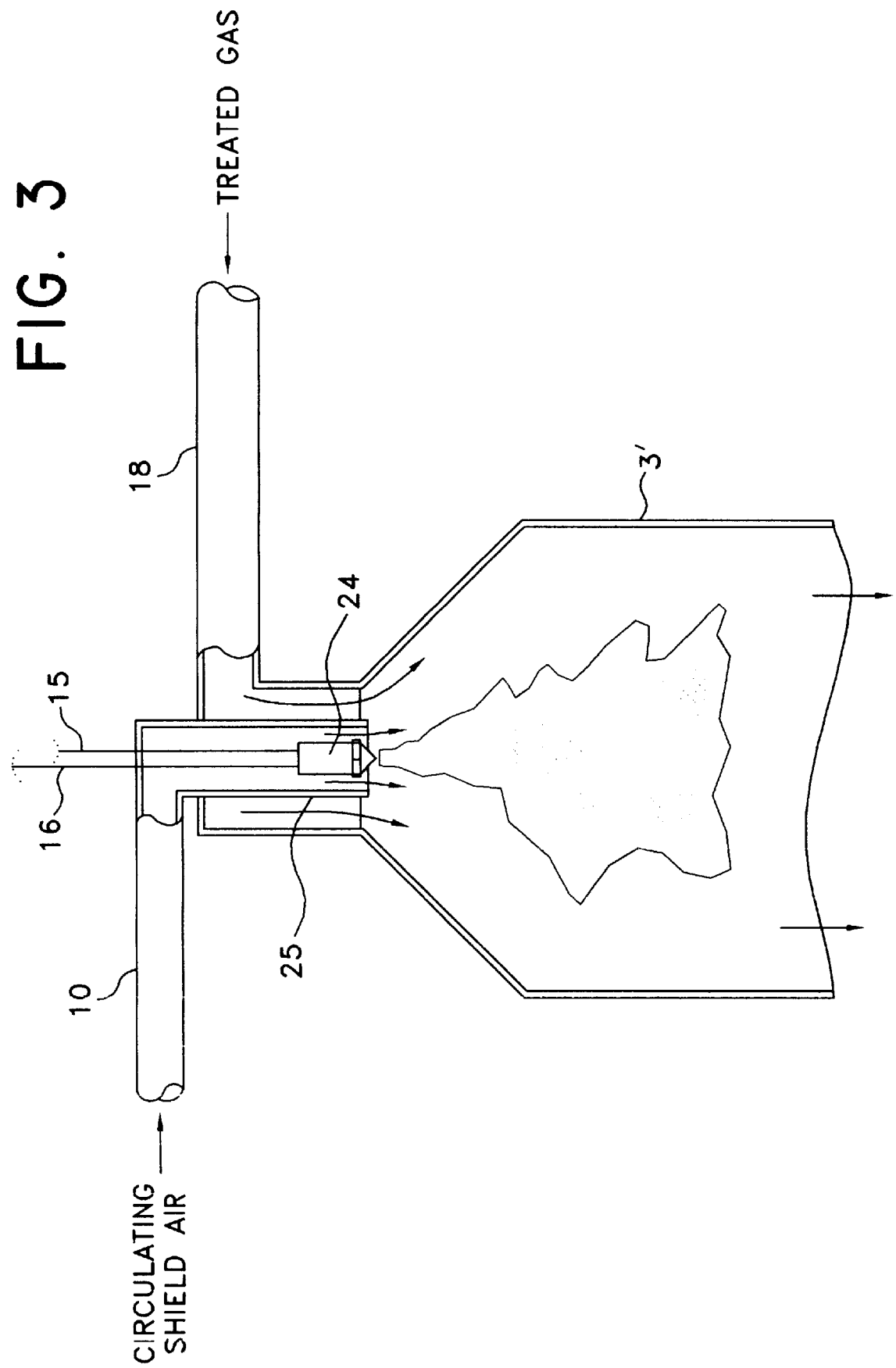

APPARATUS AND METHOD OF SPRAY DRYER/BAG FILTER USING CIRCULATING SHIELD AIR

BACKGROUND OF THE INVENTION

1. Field of the Invention

The present invention relates in general to developing a spray dryer/bag filter apparatus for removing pollutants contained in flue gas from an incinerator and, more particularly, to use a part of treated flue gas as the cooling shield air for spraying part of spray dryer. Also, the present invention is concerned with a method for removing pollutants contained in flue gas from an incinerator using the apparatus.

2. Description of the Prior Art

A Flue from a municipal waste incinerator contains typically various environmental pollutants, such as fly ash, acid gases (HCl, $SO_2$, HF, $H_2S$), heavy metals (Hg, As, Pb), dioxins (PCDDs, PCDFs), and volatile organic compounds (VOC). Among these, acid gases, including hydrogen chloride (HCl), sulfur dioxide($SO_2$), hydrogen fluoride (HF), and hydrogen sulfide ($H_2S$) are removed in spray dryer while fly ash and dried spray particle are filtered off by bag filter. The bag filter can also remove heavy metals and dioxins absorbed in the fly ash and dried spray particles.

For the better understanding about the background of the present invention, a conventional technology will be described in FIG. 1.

FIG. 1 shows a full procedure of flue gas treatment with a conventional apparatus comprising a spray tower, spray dryer, bag filter and SCR(Selective Catalytic Reduction) reactor.

Flue gas from an incinerator(1) proceeds to a spray tower in which temperature and humidity of the flue gas are controlled to the optimal condition for the subsequent process. Then, the flue gas also proceeds to a spray dryer(3) at the upper or lower part of which provides slaked hydrated lime($Ca(OH)_2$) slurry. The lower or upper part of the spray dryer is equipped with a spray nozzle through which absorbent fine particles are reacted with contaminant gas. With the reaction in the spray dryer(3), the exhaust acid gases are neutralized and the product is dried therein. These processes allow pollutants of the flue gas to be removed in the spray dryer(3). In the next stage, the scattered particles of the reaction product are moved into a bag filter(4) and filtered therein. Because the dry product remains unreacted and fly ashes are gathered at the surface of the bag filter(4), forming a layer, the acid gases which was not removed in the previous processes can also be removed with the additional reaction.

Also, this process can eliminate considerable amounts of dioxins(PCDDs, PCDFs) and heavy metals absorbed in the fly ashes. The nitrogen oxides (NO, $NO_2$) and dioxins (PCDDs, PCDFs) still remain unfiltered are moved into a catalyst reactor(7) through an ID-fan(5) and Heat-exchanger (6). Just before entering the SCR reactor(7), the residual pollutants are mixed with ammonia, which is sprayed from an ammonia tank(13), and subjected to reduction and decomposition reaction on the surface of a catalyst in the reactor(7). After that the purified gas is drained out through a stack.

Spraying part(ref. FIGS. 1 and 3) of the spray dryer(3) is composed of an atomizing nozzle(24), high pressure air conduit(16), hydrated lime slurry conduit(15), and shield air conduit(17). The atomizing nozzle is connected with a slurry storage tank, a high pressure air conduit (16) and a shield air conduit (17). In the slurry storage tank (12), slaked lime slurry is prepared by mixing hydrated lime and water. In the high pressure air conduit(16), high pressure air is provided from a compressor(9). The cooling shield air is provided with an external air by a blower (14).

As a core equipment, the spraying part serves the spray dryer with the slaked lime slurry to fine particles 70–100 $\mu$m in diameter in order to expand the contact area between the pollutants in the flue gas and the slaked lime slurry to a degree enough to facilitate the neutralization.

In the slurry conduit (15), the slaked lime is in a slurry state of 7–10% suspension. This slurry may be accumulated in the bottom of the conduit(15) and finally clog up the conduit, which requires a periodical inspection in order not to cause to hinder the operation of the apparatus. Further, after operation, the accumulated slurry must be completely eliminated from the conduit by water or air etc.

The high pressure air introduced by the air conduit (16) plays an important role in determining the particle size of the slaked lime slurry sprayed from the spray nozzle. Usually, the air has a pressure of 3–7 $kg/cm^2$. If the diameter of the slurry sprayed is below 70 $\mu$m, the slurry particles are prematurely dried, so that the removal efficiency of contaminant gas is significantly decreased. On the other hand, if the slurry particles are above 100 $\mu$m in diameter, they are dried so slowly that they cause the particle accumulated on the wall surface of the spray dryer(3), causing a trouble in operating the apparatus. The shield air is provided with cooling air through the conduit (17) with the aim of preventing the direct contact of the spray nozzle with the hot flue gas.

As described above, the removing apparatus of the flue gas from an incinerator, comprising the spray dryer(3), the compressor(9), the slurry tank (12), the blower (14) and the bag filter(4), is called spray dryer/bag filter apparatus, and the process carried out therein is called spray dryer/bag filter process.

In the aforementioned conventional spray dryer/bag filter apparatus, the shield air to be provided to the spraying part of the spray dryer is taken from the exterior by the blower (14). The shield air is the largest amount of introduced external air into the process and make the flue gas dilute in the conventional process. Such an air introduction increase an oxygen contents of the flue gas to be treated. Consequently it decreases the removal efficiency of contaminant from the spray dryer (3). Further, the external air has a serious influence on controlling the optimum oxygen contents necessary to remove other pollutants in the next catalyst reactor (7). For example, in consideration that the optimal oxygen contents for removing $NO_x$ and dioxin is 7–9%.

SUMMARY OF THE INVENTION

Therefore, it is an objective of the present invention to overcome the above problems encountered in prior arts and to provide a spray dryer/bag filter apparatus for removing flue gas from an incinerator which has a superior efficiency in purifying the flue gases.

It is another objective of the present invention to provide a spray dryer/bag filter apparatus, which needs not additional driver for providing external air as the shield air.

It is a further objective of the present invention to provide a spray dryer/bag filter apparatus, which can protect a spraying part thermally from the hot flue gas introduced in the spray dryer and prevent from the accumulation of the sprayed slaked lime slurry on the spraying part and reactor wall.

It is still a further objective of the present invention to provide a method for removing flue gas from an incinerator using the apparatus.

In accordance with an aspect of the present invention, It provides a spray dryer/bag filter apparatus for removing flue gas from an incinerator, comprising the following device: a spray dryer in which slaked lime slurry is sprayed by high pressure gas and neutralized with the flue gas to purify it; a bag filter which filters the dry products out of the purified gas drawn off said spray dryer; an ID fan which helps to discharge the purified gas from the bag filter; and according to amount of the treating flue gas, a single or a plurality of circulating shield air conduit which provide spraying parts of said spray dryer with a part of the purified gas as the shield air.

In accordance with another aspect of the present invention, the spray dryer comprises a single or a plurality of nozzle-protecting caps which cover the spraying nozzle so as not to expose it to the hot flue gas and which guide the shield air introduced via the said shield air conduit into the said spray dryer.

In accordance with a further aspect of the present invention, it also provides a method for removing flue gas from an incinerator using the spray dryer/bag filter apparatus, comprising the steps of the followings: spraying slaked lime slurry with a high pressure air media, to subject the pollutants of the flue gas to a neutralization reaction with the said sprayed slurry in a spray dryer; filtering the dry products included in the flue gas and as a result discharging the dry products and the other particles from the gas; and feeding a part of the filtered gas back to a spraying part of the spray dryer, to provide it as a shied air.

BRIEF DESCRIPTION OF THE DRAWING

Other objectives and aspects of the invention will become apparent from the following description of embodiment with reference to the accompanying drawings in which:

FIG. 2 is a schematic diagram showing a spray dryer/bag filter apparatus for removing flue gas from an incinerator, according to the present invention; and FIG. 3 is a partly enlarged diagram showing a spraying part of a spray dryer according to the present invention.

DETAILED DESCRIPTION OF THE PREFERRED EMBODIMENT

Figure 1:
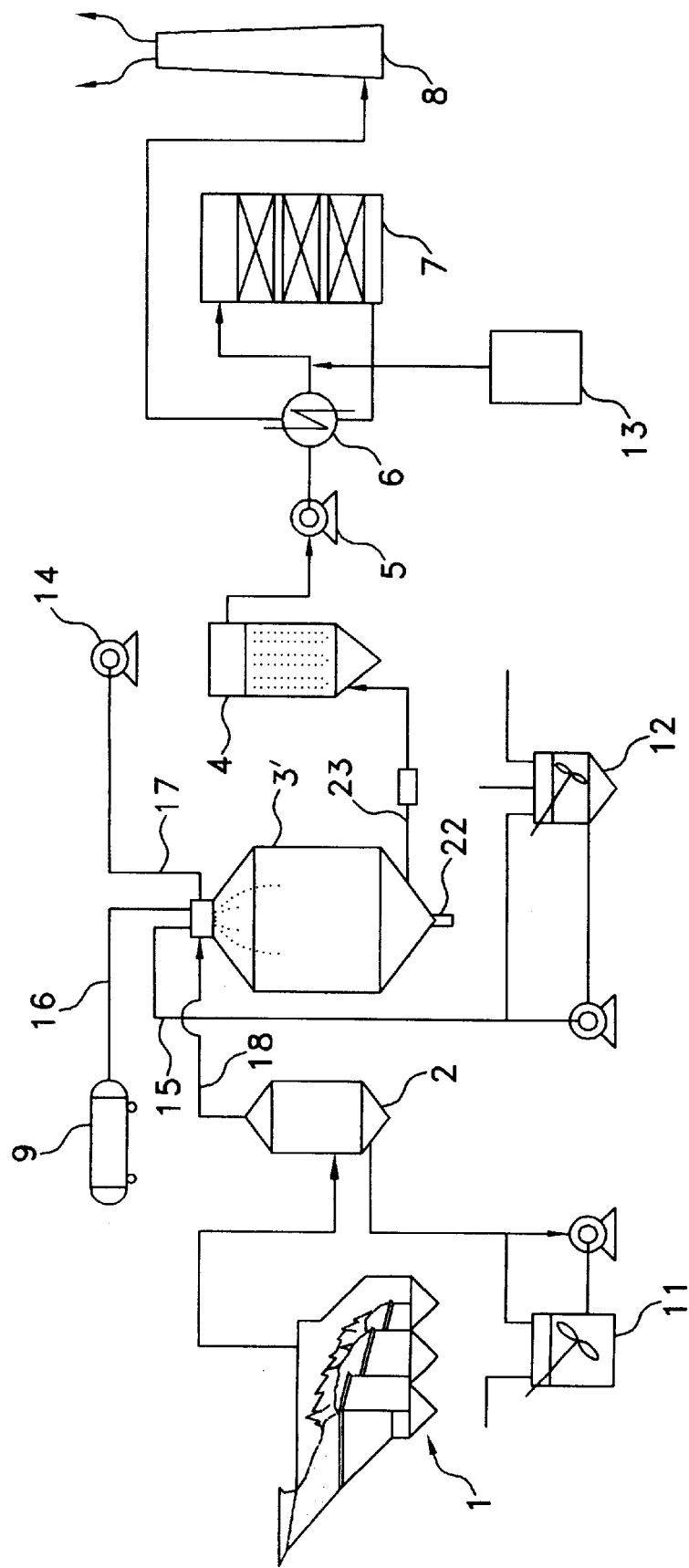
FIG. 1 is a schematic diagram showing a conventional spray dryer/bag filter apparatus for removing flue gas from an incinerator.

The preferred embodiment of the present invention can be understood clearly with reference to the accompanying drawings, wherein reference numbers are used for the name of the corresponding parts, respectively.

Referring to FIG. 2, there is a spray dryer/bag filter apparatus of the present invention, which is so structured that a shield air is induced from not external air but internal circulating air.

As seen in this figure, the spray dryer/bag filter apparatus according to the present invention comprises a folling device: spray dryer (3') in which slaked lime slurry is sprayed by high pressure gas through two fluid nozzle and neutralized with flue gas to purify it, a bag filter (4) which filters the dry products out of the purified gas drawn off the spray dryer (3'), an ID fan which helps to discharge the purified gas from the bag filter(4), and a circulating shield air conduit(10) whose one end is connected to the discharge duct of the ID fan(5) while the other end to a spraying part of the spray dryer (3'), so as to provide a part of the purified gas as shield air to the spraying part of the spray dryer (3').

While the conventional spray dryer/bag filter apparatus additionally comprises a blower to provide external air to a spraying part in order to prevent the slaked lime slurry from being dry hardened by hot flue gas, the present invention is characterized in that the purified gas already having passed through the bag filter(4) is fed back as the shield air to the spraying part of the spray dryer(3').

Here, because the circulating shield air functions for preventing the slaked lime slurry sprayed from being dry hardened by hot flue gas, it need to prevent such dry-hardening by making the temperature low sufficiently. Typically, the discharged gas by the Id fan (5) is about 150° C. In order to maintain shield air in the temperature of 50–70° C. just before the entrance of the spray dryer 3', the circulating shield air conduit (10) is designed to have enough heat-exchange area necessary for the purpose.

In contrast to the conventional apparatus which utilizes external air as the shield air, the present invention takes advantage of the purified internal gas which has an oxygen content of 7–9%, thereby keeping the optimal condition for removing dioxin in the catalyst reactor in the next stage. Therefore, the problem of low removal yield caused by the dilution of flue gas can be solved in the present invention.

The gas treated in the spray dryer (3') is introduced through a gas outlet duct (23) to the bag filter (4). The fine particles of the dry products produced from the reaction of the slurry with the flue gases are removed most in the bag filter (4), whereas particles of larger diameter are drawn off through an outlet valve (22). The space velocity of spray dryer (3') is designed for 9–12 sec.

Referring to FIG. 3, it shows a schematic spraying part of the spray dryer (3'). It comprises a two-fluid spray nozzle (24) which takes advantage of the high pressure air of 3–7 kg/cm$^2$ provided via a air conduit (16) to spray the slaked lime slurry fed via a slurry conduit (15), and a nozzle-protecting cap (25) which surrounds the spraying nozzle (24) to thermally protect it from the hot flue introduced through an flue gas inlet conduit (18) and is connected to the circulating shield air conduit (10) to guide the shield air into the spraying part.

The spraying part of the spray dryer (3') giving the most influence upon the reaction stability. It may be composed of one or a plurality of units depending on the treatment scale of flue gas. As an embodiment of one unit, the spraying part seen in the FIG. 3 is co-current downward flow. Of course a counter-current flow type can be possible., in which the spraying part is located at the top or at the bottom of the spray dryer (3'), The two-fluid atomizing nozzle sprays the slaked lime slurry into fine particles of 70–100 microns. Being fed via the slurry conduit (15), the slaked lime slurry is a dilution of 20% slaked lime suspension into 7% in water. Functioning as a spraying media for the slurry, the high pressure air of 3–7 kg/cm$^2$ is provided to the spraying nozzle by a compressor (9).

Like the spraying nozzle, the nozzle-protecting cap (25) may be composed of one or more units. It protects thermally the spraying nozzle (24) from the hot flue gas by passing the shield air through the flue gas conduit (18) to the spray dryer (3'). Further, the nozzle-protecting cap (25) prevents the fine slurry particles scattered by the spraying nozzle (24) from sticking to the upper wall surface of the spray dryer (3').

As a driving force for the provision of the circulating shield air, the intrinsic pressure difference of the procedure itself is utilized. In detail, a negative pressure of about 200 mmAq is exerted upon the upper part of the spray dryer (3') while a positive pressure of about 500 mmAq is applied to the inlet of the circulating shield air conduit (10), which is a site showing the highest pressure in the full process pathway, located near the ID fan before the catalyst reactor (7). Thus, a pressure difference of about 800 mmAq occurs, allowing the shield air to be smoothly fed without any additional driver, such as blower. The circulating gas passing through the shield air conduit (10) is 2–3% of the total flue gas.

As described herein so far, the present invention needs not to install any additional blower for providing the shield air, which can take a considerable economical advantage. In addition, the contaminant gas in the reactor is not diluted because of the absence of an external air within the reactor, resulting in an increase of the efficiency of the reactor. Further, the treatment of dioxin which is greatly affected by the oxygen contents in the next stage can be improved.

The present invention has been described in an illustrative manner, and it is to be understood the used terminology is intended to be in the nature of description rather than of limitation.

Many modifications and variations of the present invention are possible in the light of the above teachings. Therefore, it is to be understood that the invention may be practiced within the scope of the appended claims otherwise than as specifically described.

What is claimed is:

1. A spray dryer/bag filter apparatus for removing flue gas from an incinerator, comprising:

a spray dryer;

a nozzle for spraying slaked lime slurry into said dryer;

a cap surrounding and spaced from said nozzle;

a conduit for supplying heated flue gas to said dryer which passes outside of said cap and into said dryer to neutralize slurry contents;

a return conduit to draw gas from said spray dryer and supply it into the space between said cap and said nozzle at a temperature lower than said flue gas to thermally insulate said nozzle from said heated flue gas.

2. A spray dryer/bag filter apparatus as in claim 1 further comprising:

a bag filter communicating with said conduit to filter dry products from the gas drawn from spray dryer before supply of said gas to said space.

3. A spray dryer/bag filter apparatus as in claim 2 further comprising a fan to draw said gas from said spray dryer through said filter bag.

4. A spray dryer/bag filter apparatus as in claim 1 wherein said spray dryer is at a negative pressure and said purified gas in said conduit is at a higher pressure to effect supply of said purified gas to said space without a blower.

5. A spray dryer/bag filter apparatus as in claim 3 wherein said spray dryer is at a negative pressure and said purified gas in said conduit is at a higher pressure to effect supply of said purified gas to said space without a blower.

* * * * *